(12) United States Patent
Kuo

(10) Patent No.: US 7,492,582 B2
(45) Date of Patent: Feb. 17, 2009

(54) PORTABLE COMPUTER WITH DETACHABLE SOLAR CELL MODULE

(75) Inventor: Szu-Wei Kuo, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/923,661

(22) Filed: Oct. 25, 2007

(65) Prior Publication Data

US 2008/0204990 A1    Aug. 28, 2008

(30) Foreign Application Priority Data

Feb. 26, 2007    (CN)    ............ 2007 1 0200230

(51) Int. Cl.
*H05K 5/00*    (2006.01)
(52) U.S. Cl. ............ 361/683; 345/204; 40/593; 65/60.53
(58) Field of Classification Search ............ 428/219, 428/426, 451; 345/105, 204, 30, 156; 40/593, 40/562; 65/17.2, 60.53; 349/158; 361/679–687, 361/724–727
See application file for complete search history.

(56) References Cited

U.S. PATENT DOCUMENTS

| | | | |
|---|---|---|---|
| 5,936,380 A | 8/1999 | Parrish | |
| 2008/0092941 A1* | 4/2008 | Kuo | ............ 136/248 |
| 2008/0143291 A1* | 6/2008 | Lin et al. | ............ 320/101 |
| 2008/0171185 A9* | 7/2008 | Komada | ............ 428/219 |

* cited by examiner

*Primary Examiner*—Hung V Duong
(74) *Attorney, Agent, or Firm*—Frank R. Niranjan

(57) ABSTRACT

A portable computer includes a base unit with a motherboard secured thereto, a display unit pivotably attached to the base unit and having a recessed portion formed in an outer surface thereof, a solar cell module accommodated in the recessed portion, and a latching device installed on the display unit. Positive and negative first contacts are set in the recessed portion and electrically connected with the motherboard. The solar cell module includes a solar panel for converting solar energy to electricity. Positive and negative second contacts are set on the solar cell module and electrically connected with the solar panel. The second contacts are electrically connected with the corresponding first contacts to transmit electricity to the motherboard. A notch is defined in the solar cell module. The latching device includes a latching portion engaging in the notch, thereby securing the solar cell module to the display unit.

14 Claims, 6 Drawing Sheets

PORTABLE COMPUTER WITH DETACHABLE SOLAR CELL MODULE

BACKGROUND

1. Field of the Invention

The present invention relates to portable computers, and more particularly to a portable computer with detachable solar cell module.

2. Description of Related Art

In recent years, portable computers have been widely accepted by businessmen because of the advantage of high mobility. However, a battery case with rechargeable battery must be provided when a portable computer is to be used away from available electrical outlets. Even if a battery case with rechargeable battery is provided, it can only provide power for a limited time, then it must be recharged.

What is desired, therefore, is a portable computer with a detachable solar cell module.

SUMMARY

An exemplary portable computer comprises a base unit with a motherboard secured thereto, a display unit pivotably attached to the base unit and having a recessed portion formed in an outer surface thereof, a solar cell module accommodated in the recessed portion, and a latching device installed on the display unit. Positive and negative first contacts are set in the recessed portion and electrically connected with the motherboard. The solar cell module includes a solar panel configured for converting solar energy to electricity. Positive and negative second contacts are set on the solar cell module and electrically connected with the solar panel. The two second contacts are electrically connected with the two corresponding first contacts to be adapted to transmit electricity to the motherboard. A notch is defined in the solar cell module. The latching device includes a latching portion engaging in the notch of the solar cell module, thereby securing the solar cell module to the display unit.

Other advantages and novel features of the present invention will become more apparent from the following detailed description of preferred embodiment when taken in conjunction with the accompanying drawings, in which:

DETAILED DESCRIPTION

Figure 1:
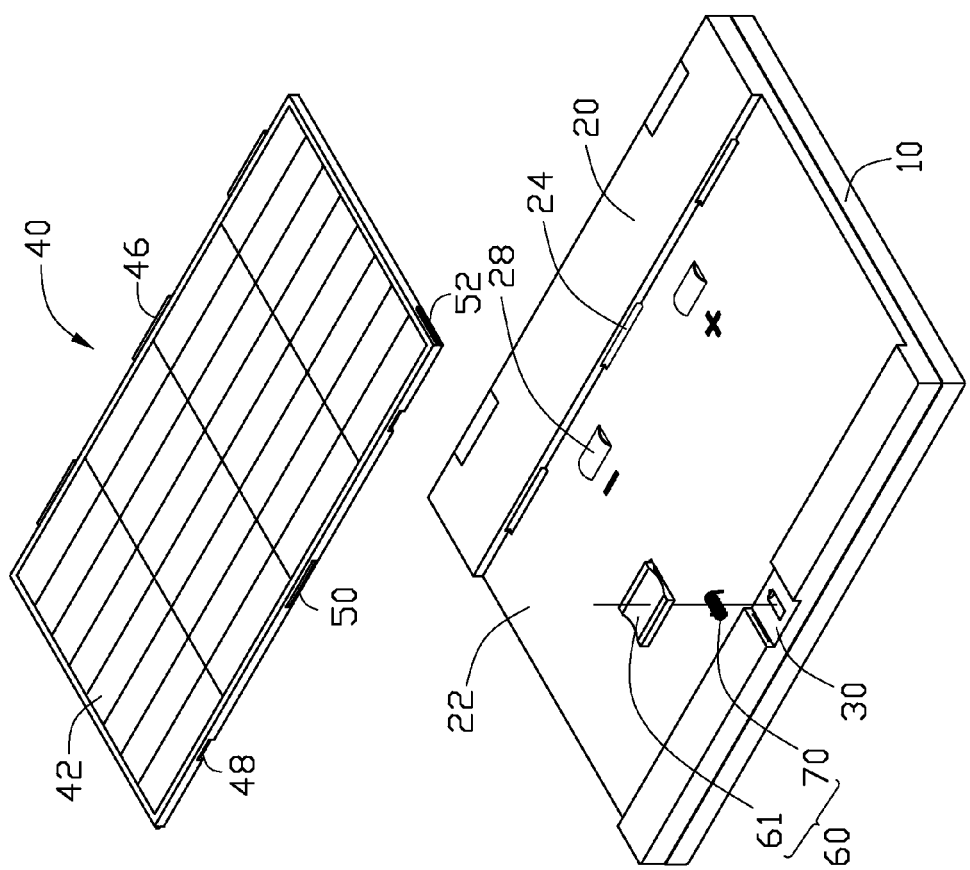
FIG. 1 is an exploded, isometric view of a portable computer in accordance with an embodiment of the present invention, the portable computer including a solar cell module, and a latching device having a latching member.

Referring to FIG. 1, in an exemplary embodiment, a portable computer includes a base unit 10, a display unit 20 pivotably secured to the base unit 10, a solar cell module 40, and a latching device 60.

Figure 2:
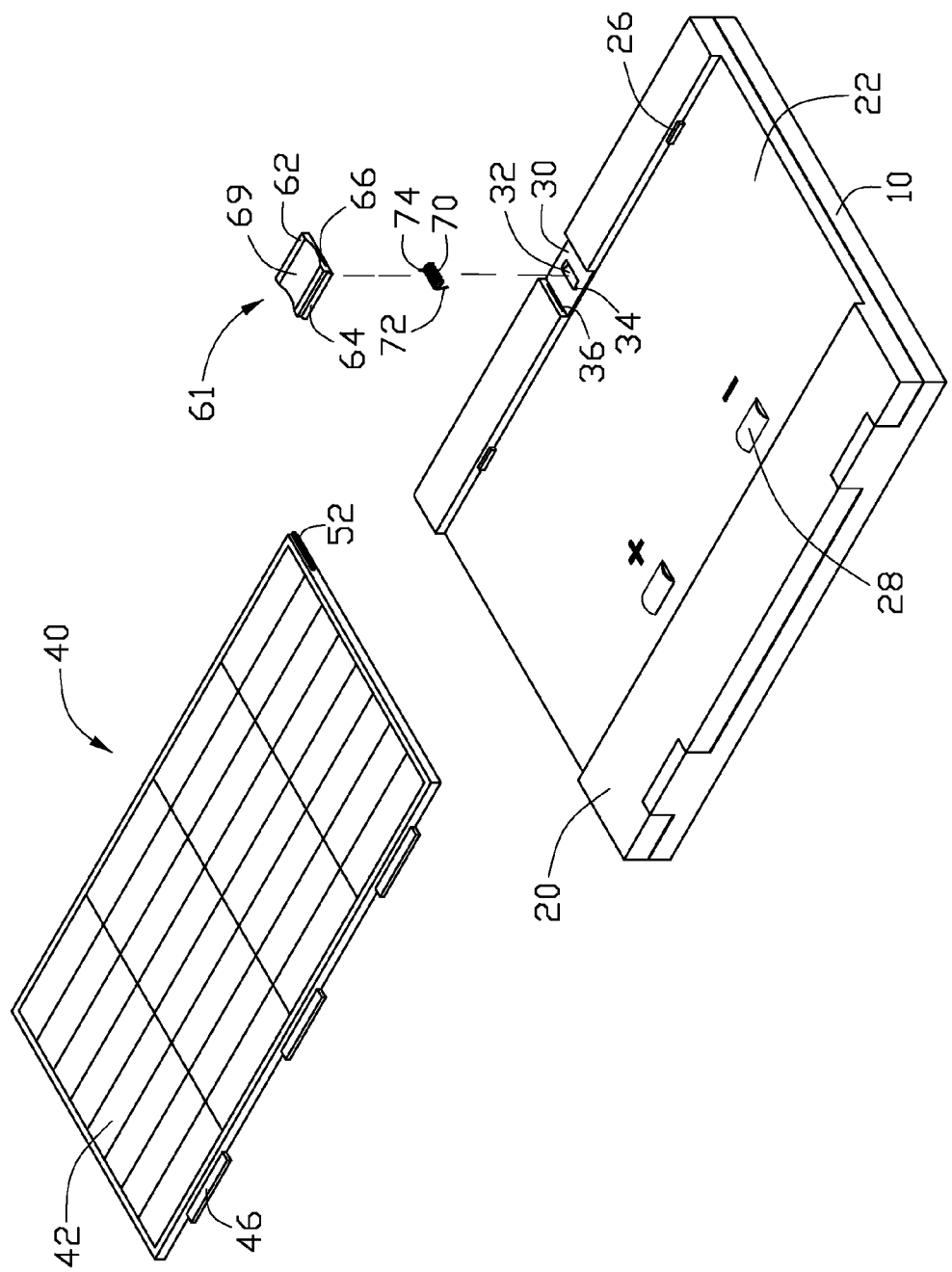
FIG. 2 shows another aspect view of FIG. 1.

Referring also to FIG. 2, the base unit 10 is a hollow chassis for accommodating a motherboard, a rechargeable battery electrically connected with the motherboard, and associated computer components therein. A recessed portion 22 is formed in an outer surface of the display unit 20 for receiving the solar cell module 40. A plurality of inserting holes 24 is defined in a side of the recessed portion 22, adjacent a junction of the base unit 10 and the display unit 20. Two aligning blocks 26 protrude from an opposite side of the recessed portion 22. Positive and negative first contacts 28 are set at a bottom of the recessed portion 22. The two first contacts 28 are electrically connected with the motherboard within the base unit 10. A holding opening 30 is defined in the outer surface of the display unit 20 adjacent the edge of the display unit 20 opposite to the junction of the base unit 10 and the display unit 20. The holding opening 30 communicates with the recessed portion 22. A first receiving hole 32 is defined in the bottom surface of the holding opening 30. A first mounting hole 34 is defined in the bottom surface of the holding opening 30 adjacent the recessed portion 22. Two elongated sliding grooves 36 are respectively defined in two opposite lateral sides of the holding opening 30 and extend along an extending direction of the first receiving hole 32.

Figure 3:
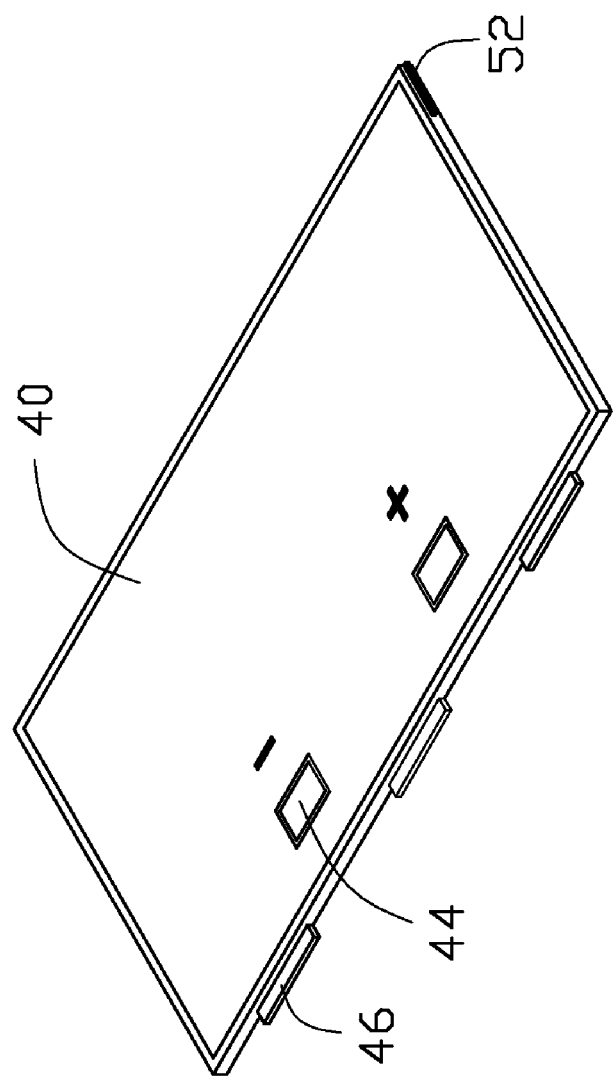
FIG. 3 shows an inverted view of the solar cell module of FIG. 1.

Referring also to FIG. 3, the solar cell module 40 includes a solar panel 42 arranged on a surface thereof. The solar panel 42 accumulates solar energy, and converts the solar energy into electricity. Positive and negative second contacts 44 are set on an opposite surface of the solar cell module 40, corresponding to the two first contacts 28 of the recessed portion 22. The two second contacts 44 are electrically connected with the solar panel 42. A plurality of tabs 46 protrudes from a side of the solar cell module 40, corresponding to the inserting holes 24 of the recessed portion 22. Two cavities 48 are defined in an opposite side of the solar cell module 40, corresponding to the aligning blocks 26 of the recessed portion 22. A notch 50 is defined in the opposite side of the recessed portion 22 between the two cavities 48. Two handles 52 respectively protrude from opposite ends of the solar cell module 40 for convenient handling of the solar cell module 40 by a user.

Figure 4:
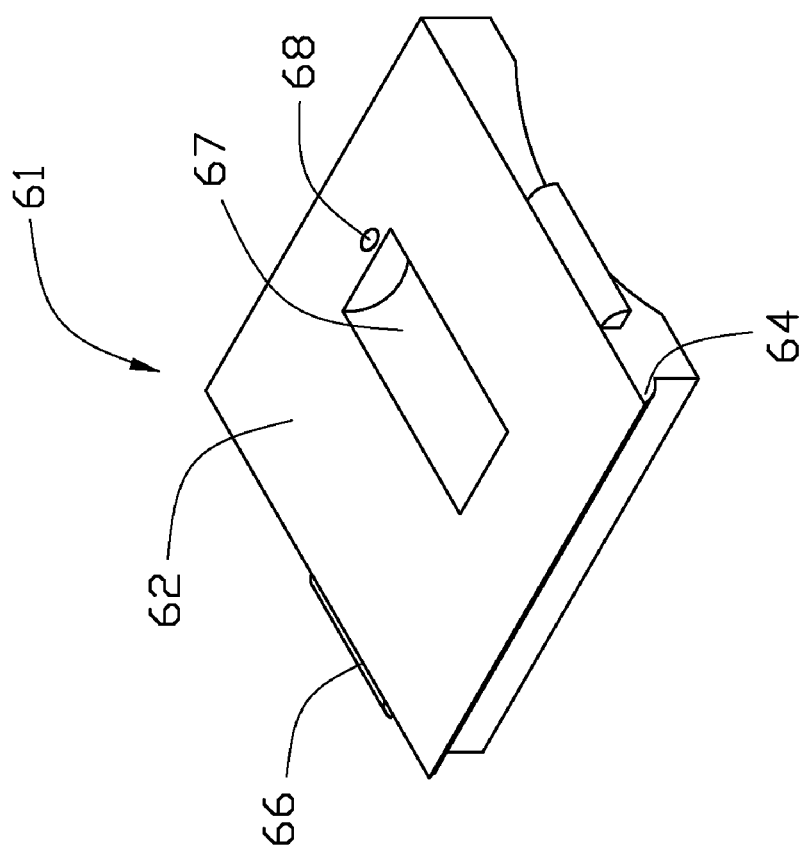
FIG. 4 is an enlarged inverted view of the latching member of the latching device of FIG. 1.
Figure 5:
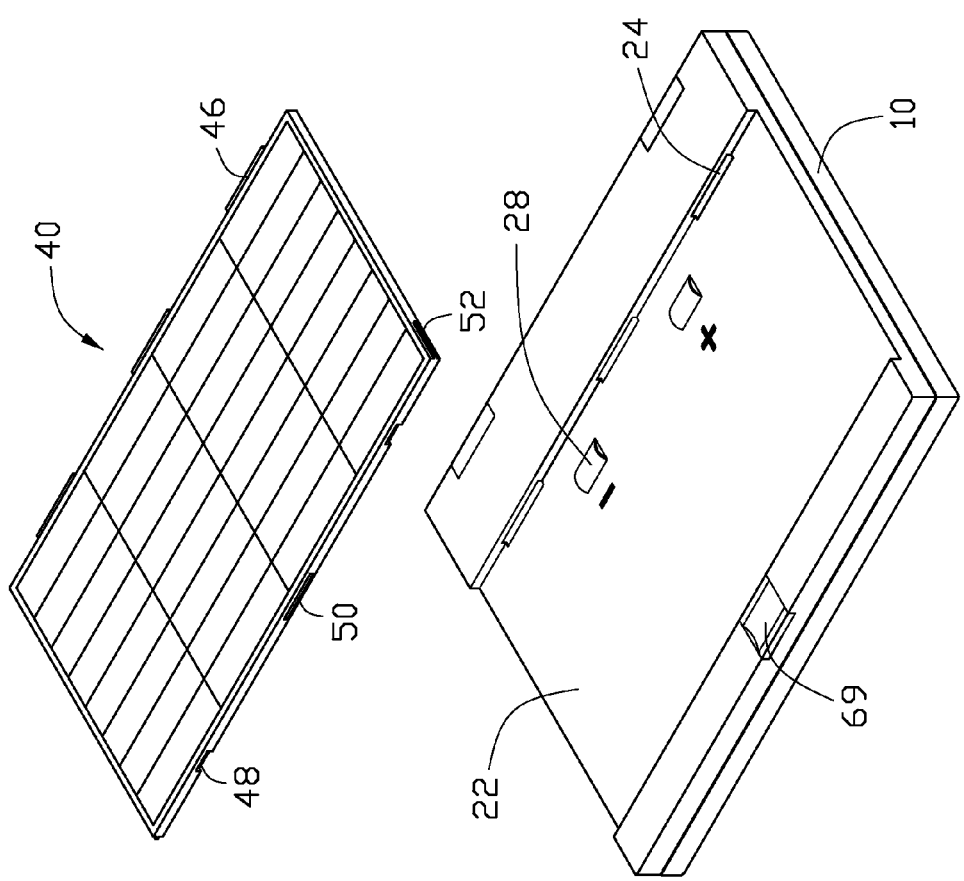
FIG. 5 is a partially assembled view of FIG. 1, with the solar cell module being unattached.
Figure 6:
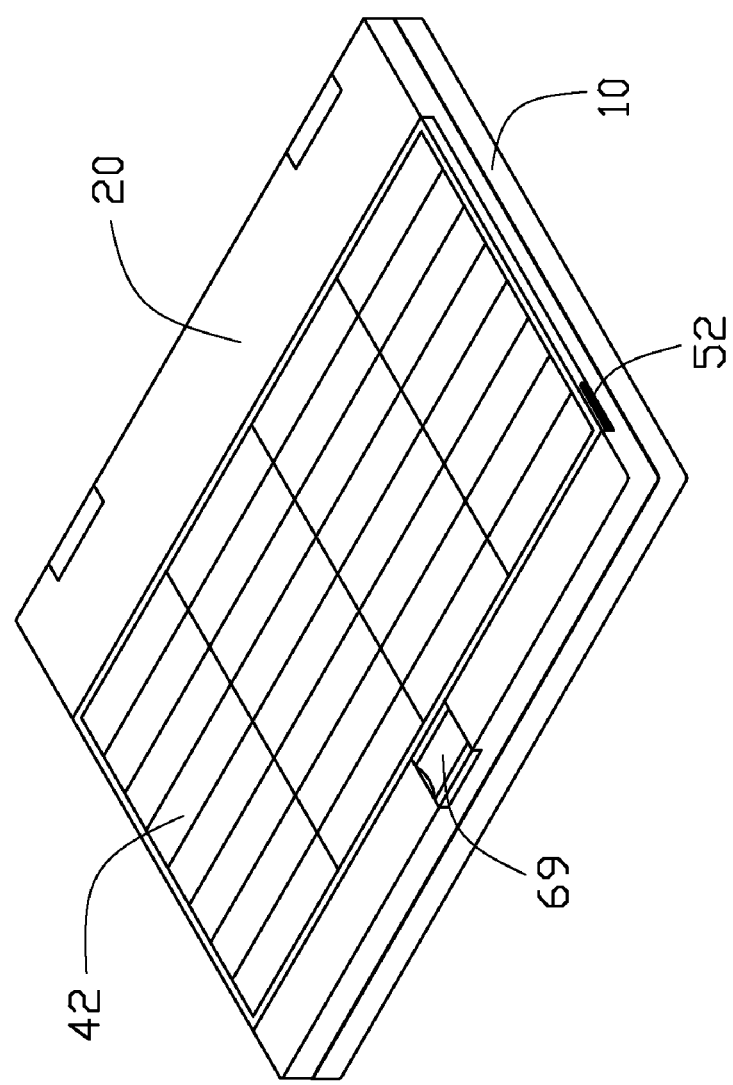
FIG. 6 is a fully assembled view of FIG. 1.

Referring also to FIG. 4, the latching device 60 includes a latching member 61 fit into the holding opening 30 of the display unit 20, and a resilient member, such as an extension spring 70. The latching member 61 includes a main body 62 and a latching portion (such as a latching wedge 64) protruding from a side of the main body 62. Two sliding tabs 66 respectively protrude from opposite ends of the main body 62, corresponding to the sliding grooves 36 of the holding opening 30. A second receiving hole 67 is defined in the underside of the main body 62. A second mounting hole 68 is defined in the underside of the main body 62, away from the latching wedge 64. A finger recess 69 (see FIG. 2) is defined in the top of the main body 62.

A first pin 72 and a second pin 74 (see FIG. 2) respectively extend from two ends of the extension spring 70, corresponding to the first mounting hole 34 of the holding opening 30 and the second mounting hole 68 of the latching member 61.

Referring to FIGS. 1-6, in assembly, the extension spring 70 is received in the first receiving hole 32 of the holding opening 30, and the first pin 72 of the extension spring 70 is installed in the first mounting hole 34 of the holding opening 30. The main body 62 of the latching member 61 is pressed into the holding opening 30. Thus, the two sliding tabs 66 of the latching member 61 are respectively snapped into the two sliding grooves 36 of the holding opening 30, and the main body 62 of the latching member 61 is secured in the holding opening 30. The extension spring 70 is received in a receiving space defined by the first receiving hole 32 and the second receiving hole 67 of the latching member 61 together, while the second pin 74 of the extension spring 70 is installed into the second mounting hole 68 of the latching member 61. Initially, the extension spring 70 may be extended to drive the latching wedge 64 of the main body 62 into the recessed portion 22 of the display unit 20.

The side of the solar cell module 40 with the tabs 46 extending therefrom, is fit into the recessed portion 22 with the tabs 46 inserting into the corresponding inserting holes 24 of the recessed portion 22. Then the latching member 61 is pushed back into the holding opening 30 by the finger recess 69 thereof, the two sliding tabs 66 of the latching member 61 respectively slide in the corresponding sliding grooves 36 of the holding opening 30 and the extension spring 70 is extended, thereby causing the latching wedge 64 of the latching member 61 to be pushed back into the holding opening 30. Once the solar cell module 40 is fully received in the recessed portion 22, the latching member 61 is released, the extension spring 70 is restored to drive the latching member 61 toward the solar cell module 40, the latching wedge 64 of the latching member 61 extends into the notch 50 of the solar cell module 40 thereby trapping the solar cell module 40 in the recessed portion 22. The two second contacts 44 of the solar cell module 40 are respectively electrically connected with the two first contacts 28 of the recessed portion 22. The two aligning blocks 26 of the recessed portion 22 are respectively received in the two cavities 48 of the solar cell module 40 to prevent the solar cell module 40 from transversely sliding in the recessed portion 22. Thus, the solar cell module 40 is firmly secured to the display unit 20.

In use, the display unit 20 is exposed to sunlight, and may be opened at an angle relative to the base unit 10 as needed to achieve greatest exposure of the solar panel 42 to sunlight. The solar panel 42 converts solar energy into electricity. The electricity is transmitted to the motherboard via the second contacts 44 and corresponding first contacts 28 to recharge the rechargeable battery.

Alternatively, the electricity from the solar panel 42 may be directly supplied to the motherboard to make the portable computer work, and recharge the rechargeable battery synchronously.

If needed, the solar cell module 40 may be replaced with a new one by pushing of the latching member 61 to drive the latching wedge 64 to disengage from the notch 50 of the solar cell module 40. The solar cell module 40 can then be removed from the display unit 20 via handling the handles 52 thereof.

Additionally, the latching device 60 can be slidably installed on the solar cell module 40, while the corresponding notch 50 can be defined in a side of the recessed portion 22. The extension spring 70 may be a compressed spring, thus, initially, the compressed spring urges the latching wedge 64 of the latching member 61 to be engaged in the notch 50 of the solar cell module 40.

When the solar cell module 40 is not needed for a time, it can be removed, and a fitted decorative cover is secured in the recessed portion 22 of the display unit 20.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable computer comprising:
   a base unit with a motherboard secured thereto;
   a display unit pivotably attached to the base unit, a recessed portion being formed in an outer surface of the display unit, positive and negative first contacts being set in the recessed portion and electrically connected with the motherboard;
   a solar cell module accommodated in the recessed portion, and comprising a solar panel configured for converting solar energy to electricity, positive and negative second contacts being set on the solar cell module and electrically connected with the solar panel, the two second contacts being electrically connected with the two corresponding first contacts to be adapted to transmit electricity to the motherboard, the solar cell module defining a notch therein; and
   a latching device slidably installed on the display unit, and comprising a latching portion engaging in the notch of the solar cell module, thereby securing the solar cell module to the display unit.

2. The portable computer as described in claim 1, wherein the latching device further comprises a latching member with the latching portion protruding therefrom and a resilient member configured for urging the latching portion of the latching member to be engaged in the notch of the solar cell module.

3. The portable computer as described in claim 2, wherein the resilient member is received in a receiving space between the latching member and the outer surface of the display unit.

4. The portable computer as described in claim 3, wherein a first mounting hole is defined in the outer surface of the display unit, a second mounting hole is defined in the latching member, and a first pin and a second pin respectively extend from the resilient member and are installed into the first mounting hole and the second mounting hole.

5. The portable computer as described in claim 4, wherein a first receiving hole is defined in the outer surface of the display unit, a second receiving hole is defined in the latching member, and the receiving space is defined by the first receiving hole and the second receiving hole together.

6. The portable computer as described in claim 5, wherein two elongated sliding grooves are respectively defined in the outer surface of the display unit, and two sliding tabs protrude from the latching member and respectively slidably engage in the sliding grooves.

7. The portable computer as described in claim 6, wherein a holding opening is defined in the outer surface of the display unit communicating with the recessed portion, the first receiving hole and first mounting hole are defined in a bottom surface of the holding opening, and the two sliding grooves are respectively defined in two opposite lateral sides of the holding opening and extend along an extending direction of the first receiving hole.

8. The portable computer as described in claim 1, wherein a plurality of inserting holes is defined in a side of the recessed portion, and a plurality of tabs protrudes from a corresponding side of the solar cell module and respectively insert into the inserting holes of the recessed portion.

9. The portable computer as described in claim 8, wherein two cavities are defined in an opposite side of the solar cell module, the notch is defined in the opposite side of the solar cell module, and two aligning blocks protrude from an opposite side of the recessed portion and are respectively received in the cavities of the solar cell module.

10. The portable computer as described in claim 1, wherein two handles respectively protrude from opposite ends of the solar cell module.

11. The portable computer as described in claim 1, wherein a rechargeable battery is secured in the base unit and electrically connected with the motherboard such that the rechargeable battery is capable of being recharged by the solar cell module.

12. A portable computer comprising:
a base unit;
a display unit pivotably attached to the base unit, positive and negative first contacts being set on an outer surface of the display unit and electrically connected with the base unit;
a solar cell module comprising a solar panel configured for converting solar energy to electricity, positive and negative second contacts being set on the solar cell module and electrically connected with the solar panel, the two second contacts being electrically connected with the two corresponding first contacts to be adapted to transmit electricity to supply the portable computer, a notch being defined in one of the display unit and the solar cell module; and
a latching member slidably installed to the other one of the display unit and the solar cell module, and comprising a latching portion capable of engaging in and withdrawing from the notch.

13. The portable computer as described in claim 12, wherein a recessed portion is formed in the outer surface of the display unit, the solar cell module is accommodated in the recessed portion.

14. The portable computer as described in claim 12, further comprising a resilient member configured for urging the latching portion of the latching member to engage in the notch.

* * * * *